(12) United States Patent
Wen et al.

(10) Patent No.: US 12,513,795 B2
(45) Date of Patent: Dec. 30, 2025

(54) LIGHTING APPARATUS

(71) Applicant: LEEDARSON LIGHTING CO., LTD., Fujian (CN)

(72) Inventors: Shuisheng Wen, Fujian (CN); Zhulong Liu, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 219 days.

(21) Appl. No.: 18/404,858

(22) Filed: Jan. 4, 2024

(65) Prior Publication Data

US 2025/0176080 A1 May 29, 2025

(30) Foreign Application Priority Data

Nov. 27, 2023 (CN) .......................... 202323222359.7

(51) Int. Cl.
*H05B 45/10* (2020.01)
*H05B 45/20* (2020.01)
*H05B 45/56* (2020.01)

(52) U.S. Cl.
CPC ............ *H05B 45/10* (2020.01); *H05B 45/20* (2020.01); *H05B 45/56* (2020.01)

(58) Field of Classification Search
CPC ...... H05B 45/50; H05B 45/375; H05B 45/38; H05B 45/3578; H05B 45/37; H05B 45/3725; H05B 45/59; H05B 45/10; H05B 45/36; H05B 45/00; H05B 45/20; H05B 45/345; H05B 45/325; H05B 47/24; H05B 45/34; H05B 6/105; H05B 45/32; H05B 45/395; H05B 45/357; H05B 47/26; H05B 41/2828; H05B 45/30; H05B 45/392; H05B 45/56; H05B 47/17; H05B 47/11; H05B 47/20; H05B 45/46; H05B 45/31; H05B 45/12; H05B 45/24; H05B 45/382; H05B 45/33; H05B 47/105; H05B 47/16; H05B 47/172; H05B 47/25; H05B 45/22; H05B 47/135; H05B 47/175; H05B 47/184; H05B 47/185; H05B 47/19; H05B 47/195; H05B 47/199; F21K 9/278; F21K 9/275; F21K 9/272; F21K 9/27; F21K 9/235; F21K 9/23; F21K 9/68; F21K 9/66; F21K 9/64; F21K 9/232; F21K 9/238; H02J 15/00; H02J 1/102; H02J 2300/20; H02J 2300/24;

(Continued)

(56) References Cited

U.S. PATENT DOCUMENTS

2016/0270164 A1* 9/2016 Xiong .................... H05B 47/24

* cited by examiner

*Primary Examiner* — Monica C King
(74) *Attorney, Agent, or Firm* — LANWAY IPR SERVICES; Chun-Ming Shih

(57) ABSTRACT

A lighting apparatus includes a light source, a driver circuit, a detector circuit and a current source. The driver circuit has a first electrode and a second electrode. The first electrode and the second electrode are configured for being coupled to two first output terminals of an external AC power source and also coupled to two second output terminals of an emergency DC power module. The detector circuit is coupled to the first electrode and the second electrode for detecting a current mode at least between an AC power mode and a DC power mode. The detector circuit supplies a control signal to the current source for indicating the current source to generate a first driving current to the light source in the AC power mode and to generate a second driving current to the light source in the DC power mode.

20 Claims, 8 Drawing Sheets

(58) Field of Classification Search
CPC .. H02J 2300/28; H02J 3/00; H02J 3/04; H02J 3/381; H02J 2207/20; H02J 7/32; H02J 7/345; H02J 7/00304; H02J 9/06; H02J 9/065; H02J 2207/40; H02J 50/10; H02J 7/0013; H02J 7/0029; H02J 7/0034; H02J 7/0044; H02J 7/0047; H02J 7/1415; H02M 1/007; H02M 1/0003; H02M 1/0012; H02M 1/008; H02M 1/0845; H02M 3/156; H02M 3/157; H02M 3/1588

See application file for complete search history.

LIGHTING APPARATUS

FIELD

The present invention is related to a lighting apparatus, and more particularly related to a lighting apparatus with multiple working modes.

BACKGROUND

Emergency lighting serves a critical role in ensuring safety and security in various environments. Its primary purpose is to provide illumination during unexpected events such as power outages, fires, or other emergencies. Without emergency lighting, people could find themselves in dark and potentially hazardous situations during critical moments.

Compliance with safety regulations is another vital reason for the importance of emergency lighting. Many building codes and safety standards mandate the installation of emergency lighting systems. These regulations are in place to protect lives and property, making it essential to adhere to them. Failing to do so can result in legal consequences and jeopardize the well-being of occupants.

Emergency lighting also plays a significant role in reducing panic during emergencies. When individuals are faced with unexpected situations, such as fires or evacuations, disorientation and anxiety can set in. Adequate emergency lighting provides a sense of security and guidance, helping people stay calm and navigate safely towards exits or safe areas.

Furthermore, emergency lighting ensures the continuity of critical services. It extends beyond exit signs and pathways to include illumination for essential areas like stairwells, fire alarm control panels, and emergency generators. These lights enable emergency responders to access vital equipment and systems, even when regular lighting is unavailable, facilitating a more effective response to emergencies.

Lastly, emergency lighting contributes to property preservation. In certain emergencies like fires, the ability to access well-lit areas can help responders identify and address hazards promptly, potentially minimizing property damage. Protecting property is an important aspect of emergency preparedness and recovery.

In conclusion, emergency lighting is indispensable for safeguarding lives, adhering to regulations, reducing panic, ensuring the continuity of essential services, and preserving property. Its role in enhancing overall safety and security is evident in various settings, from commercial buildings to residential complexes and industrial facilities.

Emergency lighting finds diverse applications in various scenarios, making it a versatile safety feature. One common use is in commercial buildings, such as office complexes and shopping malls. In the event of a power outage or fire, emergency lights guide employees, customers, and visitors to safe exits, preventing chaos and ensuring a smooth evacuation process.

In healthcare facilities, emergency lighting is crucial for maintaining patient care during emergencies. Hospitals and clinics rely on backup lighting to ensure that medical staff can continue providing essential services, surgeries can proceed, and patients can be safely transferred in the event of power disruptions or other crises.

Educational institutions, including schools and universities, also benefit from emergency lighting. It helps students, teachers, and staff safely evacuate buildings during fire drills or real emergencies. Additionally, well-lit corridors and stairwells can aid in lockdown situations, ensuring a secure environment for students and faculty.

Manufacturing and industrial settings often use emergency lighting to prevent accidents and maintain operations. In facilities with heavy machinery and hazardous materials, emergency lights help workers evacuate safely and guide emergency response teams to critical areas where immediate action may be needed.

Emergency lighting is also essential in transportation hubs, such as airports and train stations. In these bustling environments, it ensures that travelers can safely exit terminals or board transportation vehicles in the event of emergencies. Additionally, emergency lights help guide ground crews during aircraft maintenance and refueling procedures, reducing the risk of accidents.

Lastly, residential buildings, including apartment complexes and high-rise condominiums, rely on emergency lighting to protect occupants. In case of power outages or fires, emergency lights provide essential visibility in hallways, stairwells, and common areas, allowing residents to evacuate safely and facilitating the work of first responders.

These diverse use situations highlight the importance of emergency lighting in safeguarding lives, ensuring compliance with regulations, and maintaining safety and security across a wide range of environments.

The current state of emergency lighting systems can often be challenging to set up and install, posing obstacles to their effectiveness. In many cases, these systems require specialized knowledge and equipment, making them complex for individuals and organizations to implement. This complexity can result in delays in installation and even potential errors, which could jeopardize safety during emergencies.

Moreover, the maintenance of traditional emergency lighting systems can be cumbersome. Regular inspections, testing, and battery replacements are necessary to ensure that these lights function correctly when needed. This ongoing maintenance can be time-consuming and expensive, discouraging some from properly maintaining their emergency lighting, thereby diminishing its reliability.

A lack of flexibility in existing emergency lighting solutions is also a concern. Traditional systems are often hardwired into buildings, limiting their adaptability to changing layouts or needs. This rigidity can be a significant drawback, especially in dynamic environments where the configuration of spaces may change over time. As a result, many buildings may not have adequate coverage in all necessary areas.

Additionally, retrofitting older structures with emergency lighting can be a challenging and costly endeavor. The complexities of integrating emergency lighting into existing electrical systems can deter building owners from ensuring their spaces are adequately equipped to handle emergencies. This lack of retrofitting can leave occupants vulnerable in critical situations.

However, there is immense potential for improvement in the design and implementation of emergency lighting. By developing more user-friendly and flexible solutions that are easier to set up and install, we can enhance the overall safety and security of buildings. Such innovations would encourage broader adoption of emergency lighting systems, ultimately benefiting human life by providing better protection in emergencies.

SUMMARY

In some embodiments, a lighting apparatus includes a light source, a driver circuit, a detector circuit and a current source.

The driver circuit has a first electrode and a second electrode.

The first electrode and the second electrode are configured for being coupled to two first output terminals of an external AC power source and also coupled to two second output terminals of an emergency DC power module.

The detector circuit is coupled to the first electrode and the second electrode for detecting a current mode at least between an AC power mode and a DC power mode.

In the AC power mode, the driver circuit receives power from the external AC power source, where in the DC power mode, the driver circuit receives power from the emergency DC power module.

The current source has two input ends coupled to the driver circuit for generating driving currents to the light source.

The detector circuit supplies a control signal to the current source for indicating the current source to generate a first driving current to the light source in the AC power mode and to generate a second driving current to the light source in the DC power mode.

The first driving current is different from the second driving current.

In some embodiments, the driver circuit and the current source are integrated as a circuit chip.

The circuit chip has pins for receiving the control signal and for coupling to the external AC power source and the emergency DC power module.

In some embodiments, the light source includes multiple LED modules.

The multiple LED modules respectively emit lights of different color temperatures.

The current source adjusts the driving currents to change an output color temperature.

In some embodiments, the control signal indicates the current source to couple the emergency DC directly to the light source by bypassing an AC-DC converter of the driving circuit to decrease power loss.

In some embodiments, the lighting apparatus may also include a power socket for detachably attaching a battery.

In some embodiments, the power socket is an USB socket that directs the connected battery power to the driver circuit.

In some embodiments, the emergency DC power module charges an attached device via the USB socket.

In some embodiments, the lighting apparatus may also include a tuner for adjusting a light parameter of the light source.

The tuner is coupled to the driver circuit without coupling to the emergency power module.

In some embodiments, the tuner is a standard 12V tuner.

In some embodiments, the first driving current is larger than the second driving current.

In some embodiments, the detector circuit detects a power level of the emergency DC power module.

The detector circuit adjusts a light intensity according to the power level of the emergency DC power module.

In some embodiments, a different light parameter of the light source is controlled between the AC power mode and the DC power mode.

In some embodiments, in the DC power mode, the light source is controlled to produce a blink light pattern.

In some embodiments, the light source has multiple LED modules, and.

In the DC mode, only a portion of the LED modules are turned on while others are turned off.

In some embodiments, the lighting apparatus may also include a manual switch disposed on an surface of a housing for holding the light source, the driver circuit and the current source for adjust a setting related to the AC power mode and the DC power mode.

In some embodiments, the manual switch is used for setting a duration time.

The manual switch is coupled to the detector circuit.

The detector circuit adjusts the control signal to adjust a power level in the DC power mode corresponding to the duration time for which the emergency DC power module is estimated to consume off all stored power.

In some embodiments, the manual switch is used for setting a color temperature in the DC power mode.

In some embodiments, the lighting apparatus may also include a housing for holding the driver circuit, the current source, the emergency DC power module and the light source.

The housing has a handle for a hand to hold when the lighting apparatus is detached to carry as an emergency light.

In some embodiments, the lighting apparatus may also include a smoke detector.

When the smoke detector detects a danger status, the driver circuit switches to the DC power mode.

In some embodiments, a temperature detector of the emergency DC power module is coupled to the driver circuit to turn off the light source if a temperature of the emergency DC power module is over a predetermined threshold.

DETAILED DESCRIPTION

Figure 7:
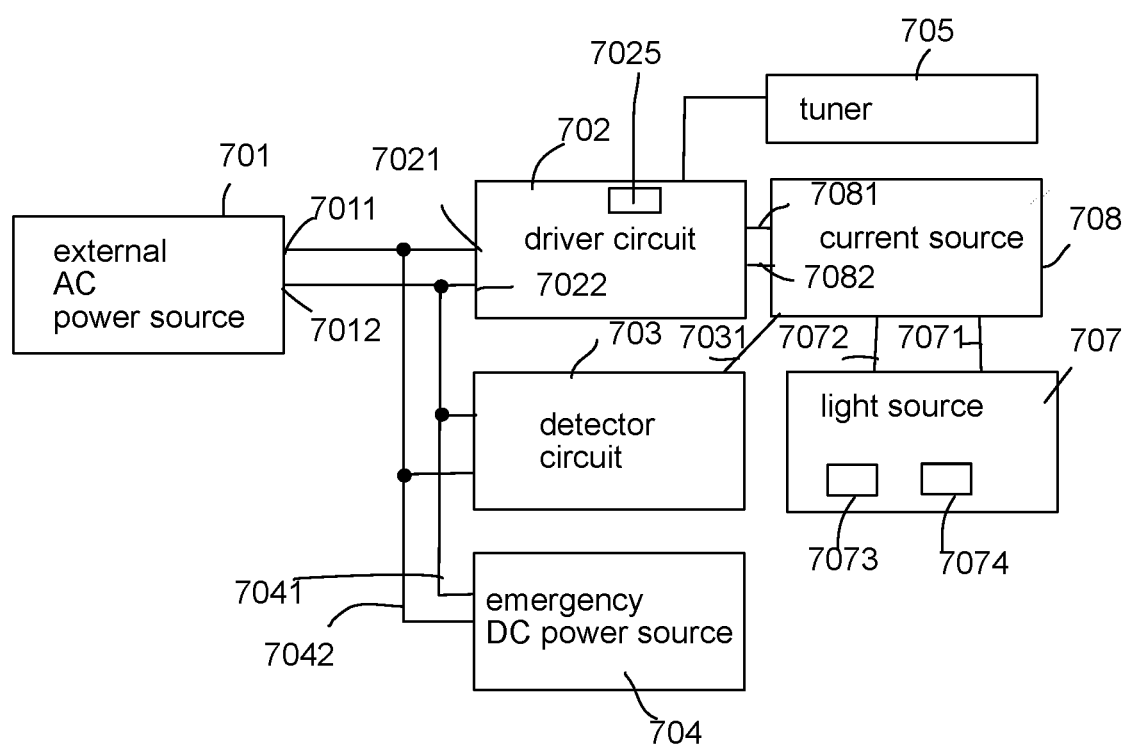
FIG. 7 illustrates another lighting apparatus embodiment.

In FIG. 7, a lighting apparatus includes a light source 707, a driver circuit 702, a detector circuit 703 and a current source 708.

The driver circuit 702 has a first electrode 7021 and a second electrode 7022.

In the heart of an LED driver circuit lies the rectifier, a critical component that plays a pivotal role in converting alternating current (AC) voltage into the direct current (DC) voltage needed to power LEDs effectively. This rectification process ensures that the LED light operates smoothly and efficiently, as LEDs inherently require a steady DC supply.

To maintain stable and consistent power delivery to the LEDs, capacitors are integrated into the driver circuit. These components act as electrical reservoirs, storing energy and then releasing it as needed to smooth out the DC voltage. By doing so, capacitors reduce voltage ripple, ensuring that the LED light emits a steady and flicker-free glow, which is essential for visual comfort.

Current regulation is another essential aspect of LED driver circuits. LEDs are highly sensitive to variations in current, and too much or too little current can lead to premature failure or suboptimal performance. Therefore, current-regulating components, such as resistors, inductors, or specialized integrated circuits (ICs), are employed to control and maintain a consistent current flow through the LEDs, safeguarding their longevity and performance.

Transistors, such as MOSFETs (Metal-Oxide-Semiconductor Field-Effect Transistors) or Bipolar Junction Transistors (BJTs), are strategically placed within the LED driver circuit to control the flow of current. These transistors serve as switches, rapidly turning the current on and off. This switching capability enables advanced features like pulse-width modulation (PWM) dimming, allowing precise control over LED brightness. Dimming is crucial for adjusting lighting levels to suit different situations and requirements.

In certain LED driver circuits, voltage regulators may be incorporated to maintain a constant output voltage. These regulators are especially valuable in situations where the input voltage or load conditions may fluctuate. Voltage regulators ensure that the LED light receives a stable voltage supply, further enhancing the reliability and longevity of the LED lighting system.

The first electrode 7021 and the second electrode 7022 are configured for being coupled to two first output terminals 7011, 7012 of an external AC power source 701 and also coupled to two second output terminals 7041, 7042 of an emergency DC power module 704.

Emergency power sources are vital components in light devices, guaranteeing their functionality during unforeseen power disruptions or emergencies. They are integral to maintaining safety, security, and illumination. Here are five critical aspects of emergency power in light devices:

Emergency lighting systems often rely on backup batteries as a primary source of emergency power. These batteries are designed to store electrical energy and provide power to the light device when the main power supply is interrupted. Backup batteries ensure that crucial areas remain well-lit, allowing occupants to safely exit buildings and navigate in the dark during emergencies.

For more advanced light devices and systems, uninterruptible power supplies (UPS) are deployed as emergency power sources. UPS units consist of batteries and power inverters that seamlessly switch to battery power when the primary power source is disrupted. This feature guarantees uninterrupted illumination and maintains the functionality of essential equipment, such as emergency exit signs and security cameras, during power outages.

In certain scenarios, light devices require generator backup as a robust emergency power source. Generators are capable of independently producing electricity, offering a reliable and continuous power supply during prolonged outages. They are frequently integrated with automatic transfer switches, ensuring a smooth transition from the primary power source to the backup generator.

Energy storage systems, such as lithium-ion batteries, are gaining prominence as emergency power sources for light devices. These advanced batteries can store significant amounts of energy and discharge it efficiently when needed. They offer compact and long-lasting solutions that can power LED lights, ensuring continuous illumination in various applications.

Indoor power sources are the backbone of electrical systems in various environments, ensuring a reliable supply of electricity for lighting, appliances, and equipment. The 110V power line, often referred to as the live or hot wire, carries alternating current (AC) electricity from the electrical distribution panel to outlets and devices throughout a building. This standard voltage level powers a wide range of electrical equipment in homes, offices, and commercial spaces, making it a fundamental component of indoor electrical systems.

The neutral line, on the other hand, serves as the return or grounded conductor in indoor power sources. It completes the electrical circuit by providing a path for the current to return to the electrical distribution panel after flowing through devices. In a typical electrical system, the neutral line is close to 0V potential compared to the hot wire. It plays a crucial role in maintaining the balance of the electrical circuit, ensuring safe and efficient electricity flow. The neutral line is connected to the ground at the main electrical panel, providing a safety mechanism for redirecting fault currents in the event of a short circuit.

In addition to the 110V power line and neutral line, indoor power sources also include a ground wire. This ground wire serves as a safety feature, providing a direct path to the earth for dissipating excess electrical energy in the event of electrical faults, such as short circuits or surges. It helps protect individuals and property from electrical hazards by diverting dangerous currents away from equipment and structures.

For specific applications, such as industrial and commercial settings, a dedicated fire line may be present as part of the indoor power source. This fire line is designed to power critical life safety equipment, including fire alarms and emergency lighting, in case of a fire or emergency situation. It operates independently of the regular electrical circuits to ensure that these essential systems remain operational even during power outages or when there is damage to the main electrical supply.

Ensuring the proper installation and maintenance of indoor power sources, including the 110V power line, neutral line, and any fire lines, is essential for safety and compliance with electrical codes and regulations. Compliance with these standards is crucial to minimizing the risk of electrical hazards, fires, and electrical failures, ultimately protecting both people and property. Regular inspections and maintenance are essential to guarantee the reliability of these power sources.

The detector circuit 703 is coupled to the first electrode 7021 and the second electrode 7022 for detecting a current mode at least between an AC power mode and a DC power mode.

Figure 5:
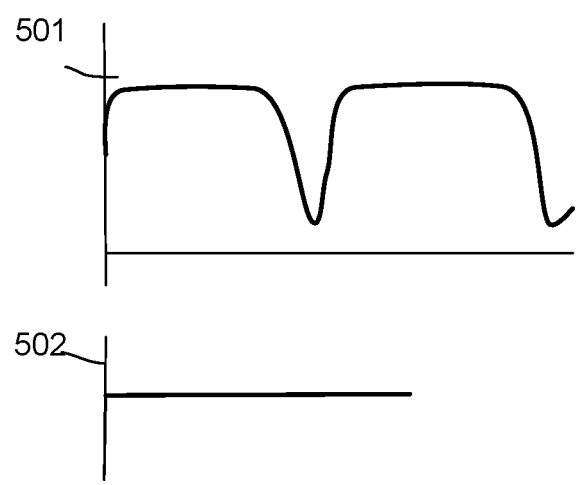
FIG. 5 illustrates different signal detection examples.

FIG. 5 shows two detected currents that may be detected by the detector circuit. The diagram 501 shows an AC power mode, where the external AC power source, like a normal 110V power supply from indoor power source. The diagram 502 shows a DC power mode where for some accident reasons, the external AC power is cut off.

In FIG. 7, in the AC power mode, the driver circuit 702 receives power from the external AC power source 701. In the DC power mode, the driver circuit 702 receives power from the emergency DC power module 704.

The current source 708 has two input ends 7081, 7082 coupled to the driver circuit 702 for generating driving currents 7071, 7072 to the light source 707.

The detector circuit 703 supplies a control signal 7031 to the current source 708 for indicating the current source 708 to generate a first driving current to the light source in the AC power mode and to generate a second driving current to the light source in the DC power mode.

The first driving current is different from the second driving current.

For example, the first driving current has a different voltage or current values as the second driving current.

In addition, the first driving current and the second driving current may refer to multiple sub-currents respectively supplied to multiple LED modules 7073, 7074.

In some embodiments, the driver circuit 702 and the current source 708 are integrated as a circuit chip. For example, the circuit components are integrated into an integrated chip that provides pins for connecting to different signals.

The circuit chip has pins for receiving the control signal and for coupling to the external AC power source and the emergency DC power module.

In some embodiments, the light source includes multiple LED modules, as illustrated in FIG. 7.

The multiple LED modules respectively emit lights of different color temperatures.

The current source adjusts the driving currents to change an output color temperature.

In some embodiments, the control signal indicates the current source to couple the emergency DC directly to the light source by bypassing an AC-DC converter 7025 of the driving circuit to decrease power loss.

Figure 8:
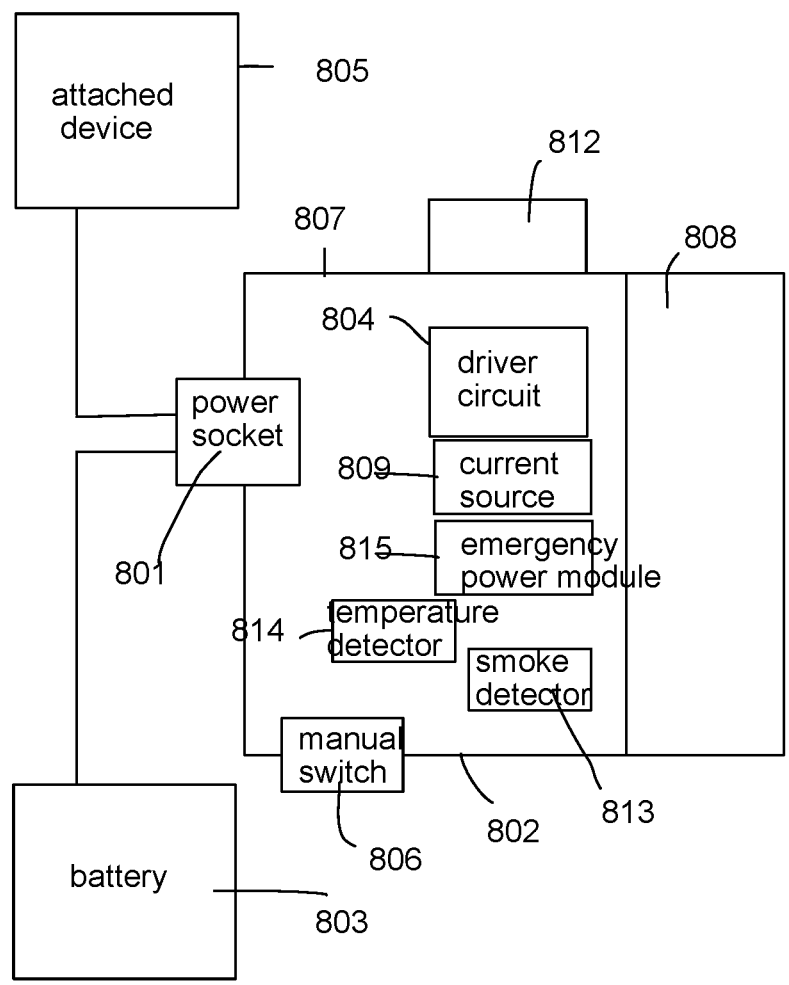
FIG. 8 shows another embodiment.

In FIG. 8, the lighting apparatus may also include a power socket 801 for detachably attaching a battery 803.

In some embodiments, the power socket 801 is an USB socket that directs the connected battery power to the driver circuit 804.

In some embodiments, the emergency DC power module charges an attached device 805 via the USB socket.

In FIG. 7, the lighting apparatus may also include a tuner 705 for adjusting a light parameter of the light source.

The tuner 705 is coupled to the driver circuit 702 without coupling to the emergency power module 704.

In some embodiments, the tuner 705 is a standard 12V tuner.

A 12V tuner, commonly referred to as a voltage regulator or dimmer, is a vital component in light devices designed to provide users with the capability to adjust the brightness or intensity of the emitted light. Its primary function lies in controlling the voltage supplied to the light source, typically LEDs (Light Emitting Diodes). By altering the voltage, the 12V tuner effectively manages the current flowing through the LED, resulting in the modulation of light intensity. In essence, it acts as a dimmer switch, empowering users to tailor the lighting output to their specific preferences or requirements.

The ability to adjust light intensity offers several significant benefits. Firstly, it allows for the creation of diverse lighting atmospheres, ranging from brightly illuminated spaces for tasks or productivity to softer, subdued lighting for relaxation or ambience. Beyond aesthetic and functional advantages, dimming lights can contribute to energy conservation. Lowering the intensity of LEDs reduces their power consumption, which not only extends the lifespan of the light source but also results in cost savings on electricity bills.

12V tuners find widespread application in various lighting scenarios. In residential settings, they are commonly integrated into home lighting systems, affording residents the ability to craft cozy, well-lit environments in different rooms. In commercial environments such as offices and retail stores, dimmers help enhance the overall ambiance and can be employed to save energy during non-peak hours. Moreover, in the automotive industry, 12V tuners are used to enable drivers to customize the brightness of interior or exterior lights, thereby enhancing visibility or creating a more comfortable driving experience.

When selecting a 12V tuner, it's imperative to ensure compatibility with the specific LED light device it will control. Proper installation and wiring are essential to guarantee both safe and effective dimming control. Depending on the type of tuner used, it may incorporate manual controls such as rotary knobs or digital interfaces that allow users to finely adjust light intensity. Factors to consider when choosing a 12V tuner include its maximum load capacity, compatibility with the power source, and suitability for the particular LED lighting technology to achieve the desired lighting effects.

In some embodiments, the first driving current is larger than the second driving current. In emergency case, sometimes the light intensity is adjusted smaller to keep a longer duration.

In some embodiments, the detector circuit 703 detects a power level of the emergency DC power module 704.

The detector circuit 703 adjusts a light intensity according to the power level of the emergency DC power module 704.

In some embodiments, a different light parameter of the light source is controlled between the AC power mode and the DC power mode.

In some embodiments, in the DC power mode, the light source is controlled to produce a blink light pattern.

For example, in some places required higher safety, the emergency light should also provide a guide for people to run away from emergency situation. The blinking pattern attracts human attention and provides guiding function.

In some embodiments, the light source has multiple LED modules.

In the DC mode, only a portion of the LED modules are turned on while others are turned off.

In some embodiments, the lighting apparatus may also include a manual switch 806 disposed on an surface of a housing 807 for holding the light source 808, the driver circuit 804 and the current source 809 for adjust a setting related to the AC power mode and the DC power mode.

In some embodiments, the manual switch 806 is used for setting a duration time.

The manual switch 806 is coupled to the detector circuit.

The detector circuit adjusts the control signal to adjust a power level in the DC power mode corresponding to the duration time for which the emergency DC power module is estimated to consume off all stored power.

In some embodiments, the manual switch 806 is used for setting a color temperature in the DC power mode.

In some embodiments, the lighting apparatus may also include a housing 807 for holding the driver circuit, the current source, the emergency DC power module and the light source.

The housing has a handle 812 for a hand to hold when the lighting apparatus is detached to carry as an emergency light.

In some embodiments, the lighting apparatus may also include a smoke detector 813.

When the smoke detector detects a danger status, the driver circuit switches to the DC power mode.

In some embodiments, a temperature detector 814 of the emergency DC power module 815 is coupled to the driver circuit to turn off the light source if a temperature of the emergency DC power module is over a predetermined threshold.

The manual switch provides a convenient setting that is not noted in past. For example, the manual switch mentioned above can be used for handling different situations. Users who buy the lighting apparatus only needs to adjust the manual switch to get what they need, which is convenient and flexible.

Diverse needs arise when it comes to emergency lighting solutions, and these requirements often vary based on the specific circumstances and locations. In some emergency cases, the primary concern is to increase the duration of emergency use time, especially in areas prone to frequent power outages, like rural places. In contrast, in other scenarios, individuals prioritize having a stronger light intensity during emergencies, particularly when not all light devices come equipped with emergency batteries.

In rural areas or places with unreliable power infrastructure, extended emergency duration is a critical requirement. Residents may experience frequent power cuts due to various reasons, such as inclement weather, infrastructure limitations, or remote locations. In such cases, having emergency lighting solutions that can provide extended illumination becomes essential for safety and convenience. This allows individuals to have access to adequate lighting during extended power outages, ensuring that essential tasks can continue without disruption.

Conversely, in situations where emergency lighting devices lack built-in emergency batteries, people may prioritize stronger light intensity during emergencies. In these cases, the absence of a dedicated emergency power source means that the device relies solely on its primary power supply. To compensate for this limitation, individuals may seek emergency lighting solutions that offer brighter and more intense illumination when needed. This increased brightness can be vital in critical situations, such as evacuations or emergency response efforts.

The choice between prioritizing extended emergency duration or stronger light intensity ultimately depends on the specific requirements and challenges of a given environment. Rural areas or regions with frequent power outages may find it more beneficial to invest in emergency lighting solutions with extended runtime capabilities. On the other hand, locations with devices lacking emergency batteries may focus on acquiring additional lighting options that provide stronger illumination when traditional power sources are disrupted.

Emergency lighting technology continues to evolve, offering a range of solutions to meet these diverse needs. It's crucial for individuals and organizations to assess their specific requirements and select the most suitable emergency lighting options based on factors like location, power reliability, and the presence of built-in emergency features. Ultimately, the goal is to ensure that people have access to reliable and effective emergency lighting solutions tailored to their unique situations, whether that means extending duration or increasing light intensity during critical moments.

Figure 1:
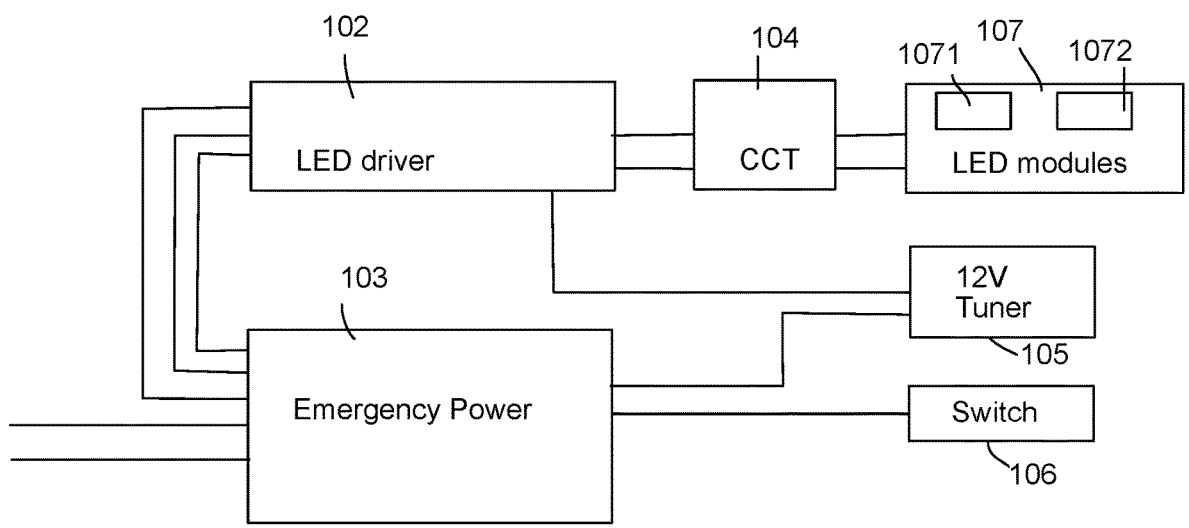
FIG. 1 illustrates a connection diagram of a first embodiment.

Please refer to FIG. 1, which illustrates a lighting apparatus embodiment.

In FIG. 1, the LED driver 102 is coupled to an emergency power 103 like a battery that is connected to an external power source. There is a color temperature control CCT 104 for adjusting a mixed color temperature of the LED modules 1071, 1072 of LED modules 107. There is a switch 106 used for testing the emergency power 103.

There is a 12V tuner 105 that is coupled to the emergency power 103 and the LED driver 102. Compared with the embodiment in FIG. 7, such confirmation is more difficult to be configured and installed.

Figure 2:
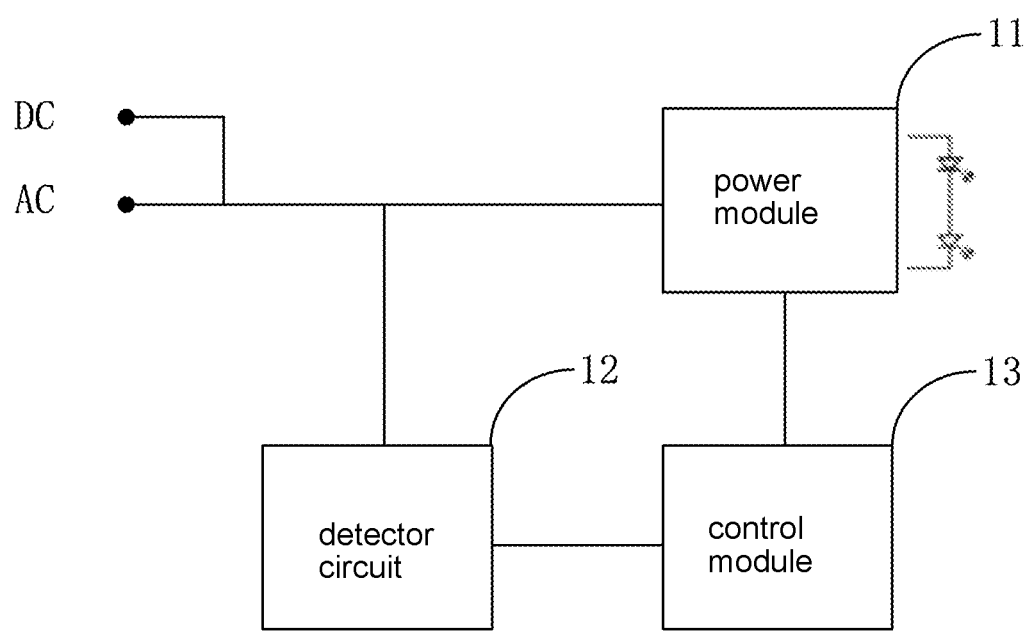
FIG. 2 illustrates a electronic component structure.

FIG. 2 illustrates another embodiment. In FIG. 2, the DC and AC power are coupled to the same power module 11. There is a detector circuit 12 coupled to the DC and AC power for adjusting a different working mode so that the control module 13 may controls the power module to operate differently in normal mode and emergency mode. More details are explained above when describing the embodiment of FIG. 7.

Figure 3:
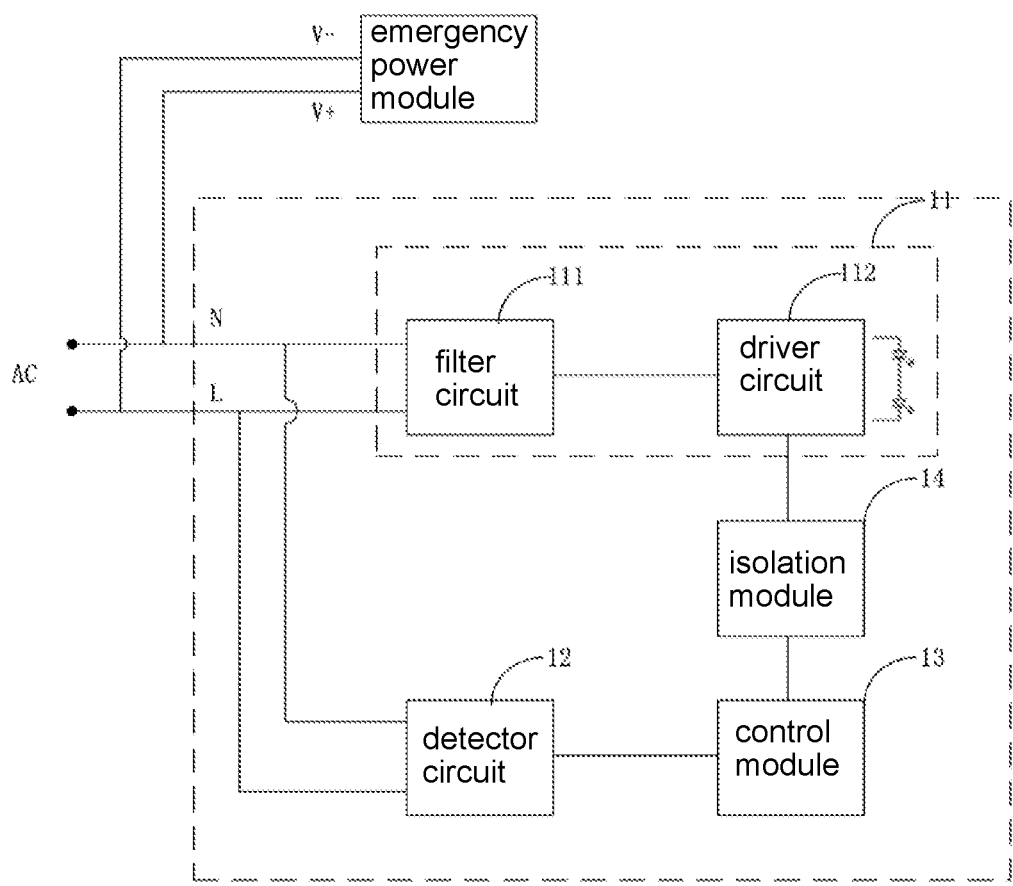
FIG. 3 illustrates another embodiment architecture of a lighting apparatus.

FIG. 3 illustrates a detailed diagram. In FIG. 3, the driver circuit 112 supplies power to the LED modules. There is a filter circuit 11 as a part of the power module 11 for filtering input power. A detector circuit 12 is coupled to the power input to detect the working mode. A control module 13 is used for control the driver circuit 112. An isolation module 14 is disposed for keeping the circuit components working normally, e.g. using optical coupled control design.

Figure 4:
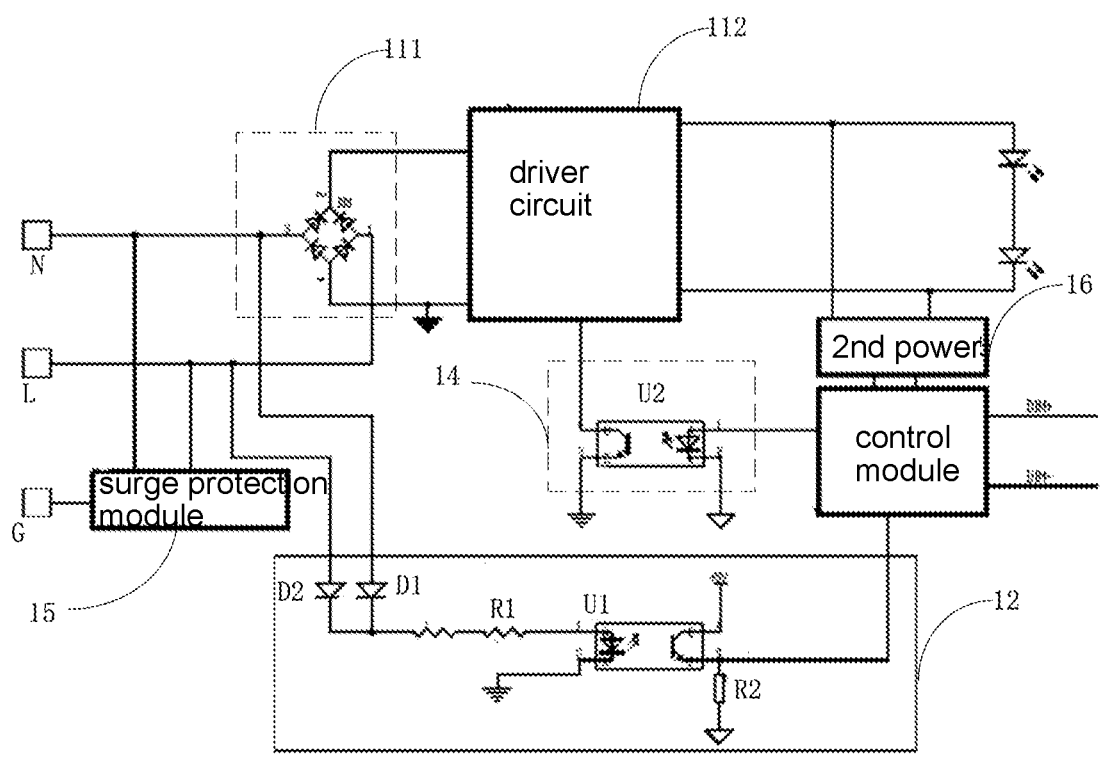
FIG. 4 illustrates a detailed circuit diagram example in another embodiment.

FIG. 4 illustrates a detailed diagram of FIG. 3. The bridge circuit 111 is used for converting AC power to DC power. There is also a surge protection module 15 disposed for protecting the overall device. The detector circuit 12 has diodes and optical control switch U1 to selectively changes to the AC power mode or the DC power mode. There is a secondary power 16 for providing auxiliary power to the control module.

Figure 6:
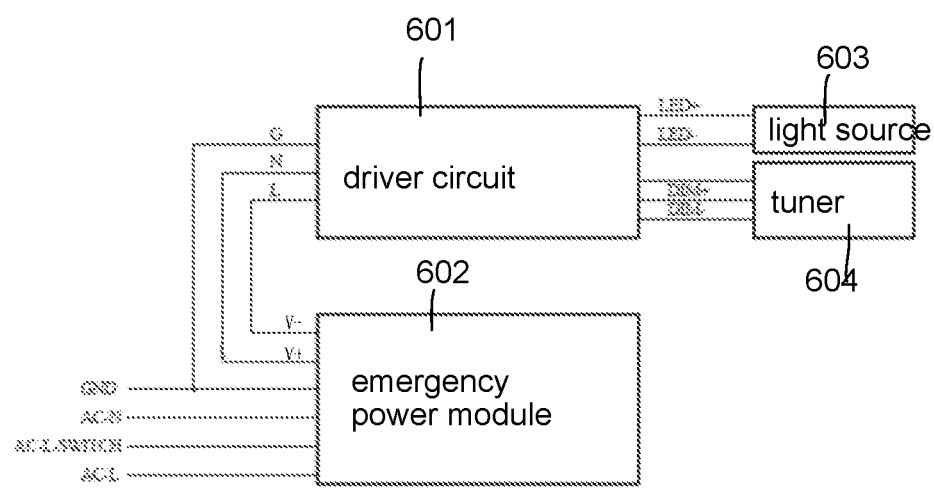
FIG. 6 illustrates a lighting apparatus embodiment example.

FIG. 6 shows another embodiment. In FIG. 6, the driver circuit 601 is coupled to the emergency power module 602. The tuner 604 is only coupled to the driver circuit 601 for controlling the light parameter of the light source 603.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a light source;
   a driver circuit with a first electrode and a second electrode, wherein the first electrode and the second electrode are configured for being coupled to two first output terminals of an external AC power source and also coupled to two second output terminals of an emergency DC power module;
   a detector circuit coupled to the first electrode and the second electrode for detecting a current mode at least between an AC power mode and a DC power mode, wherein in the AC power mode, the driver circuit receives power from the external AC power source, where in the DC power mode, the driver circuit receives power from the emergency DC power module; and
   a current source with two input ends coupled to the driver circuit for generating driving currents to the light source, wherein the detector circuit supplies a control signal to the current source for indicating the current source to generate a first driving current to the light source in the AC power mode and to generate a second driving current to the light source in the DC power mode, wherein the first driving current is different from the second driving current.

2. The lighting apparatus of claim 1, wherein the driver circuit and the current source are integrated as a circuit chip, wherein the circuit chip has pins for receiving the control signal and for coupling to the external AC power source and the emergency DC power module.

3. The lighting apparatus of claim 1, wherein the light source comprises multiple LED modules, wherein the multiple LED modules respectively emit lights of different color temperatures, wherein the current source adjusts the driving currents to change an output color temperature.

4. The lighting apparatus of claim 3, wherein the control signal indicates the current source to couple the emergency DC directly to the light source by bypassing an AC-DC converter of the driving circuit to decrease power loss.

5. The lighting apparatus of claim 1, further comprising a power socket for detachably attaching a battery.

6. The lighting apparatus of claim 5, wherein the power socket is an USB socket that directs the connected battery power to the driver circuit.

7. The lighting apparatus of claim 6, wherein the emergency DC power module charges an attached device via the USB socket.

8. The lighting apparatus of claim 1, further comprising a tuner for adjusting a light parameter of the light source, wherein the tuner is coupled to the driver circuit without coupling to the emergency power module.

9. The lighting apparatus of claim 8, wherein the tuner is a standard 12V tuner.

10. The lighting apparatus of claim 1, wherein the first driving current is larger than the second driving current.

11. The lighting apparatus of claim 1, wherein the detector circuit detects a power level of the emergency DC power module, wherein the detector circuit adjusts a light intensity according to the power level of the emergency DC power module.

12. The lighting apparatus of claim 1, wherein a different light parameter of the light source is controlled between the AC power mode and the DC power mode.

13. The lighting apparatus of claim 12, wherein in the DC power mode, the light source is controlled to produce a blink light pattern.

14. The lighting apparatus of claim 1, wherein the light source has multiple LED modules, and wherein in the DC mode, only a portion of the LED modules are turned on while others are turned off.

15. The lighting apparatus of claim 1, further comprising a manual switch disposed on a surface of a housing for holding the light source, the driver circuit and the current source for adjust a setting related to the AC power mode and the DC power mode.

16. The lighting apparatus of claim 15, wherein the manual switch is used for setting a duration time, wherein the manual switch is coupled to the detector circuit, wherein the detector circuit adjusts the control signal to adjust a power level in the DC power mode corresponding to the duration time for which the emergency DC power module is estimated to consume off all stored power.

17. The lighting apparatus of claim 15, wherein the manual switch is used for setting a color temperature in the DC power mode.

18. The lighting apparatus of claim 1, further comprising a housing for holding the driver circuit, the current source, the emergency DC power module and the light source, wherein the housing has a handle for a hand to hold when the lighting apparatus is detached to carry as an emergency light.

19. The lighting apparatus of claim 1, further comprising a smoke detector, wherein when the smoke detector detects a danger status, the driver circuit switches to the DC power mode.

20. The lighting apparatus of claim 1, wherein a temperature detector of the emergency DC power module is coupled to the driver circuit to turn off the light source if a temperature of the emergency DC power module is over a predetermined threshold.

* * * * *